(12) United States Patent
Colette et al.

(10) Patent No.: US 9,551,234 B2
(45) Date of Patent: Jan. 24, 2017

(54) DEVICE FOR CONTROLLING PIVOTABLE VANES OF A TURBO-MACHINE

(75) Inventors: Christophe Colette, Pau (FR); Bernard Lalanne, Pau (FR)

(73) Assignee: TURNOMECA, Bordes (FR)

( * ) Notice: Subject to any disclaimer, the term of this patent is extended or adjusted under 35 U.S.C. 154(b) by 926 days.

(21) Appl. No.: 13/813,257

(22) PCT Filed: Jul. 28, 2011

(86) PCT No.: PCT/FR2011/051833
§ 371 (c)(1),
(2), (4) Date: Jan. 30, 2013

(87) PCT Pub. No.: WO2012/013909
PCT Pub. Date: Feb. 2, 2012

(65) Prior Publication Data

US 2013/0129487 A1    May 23, 2013

(30) Foreign Application Priority Data

Jul. 30, 2010 (FR) ...................................... 10 56338

(51) Int. Cl.
*F01D 17/16* (2006.01)
(52) U.S. Cl.
CPC ............. *F01D 17/16* (2013.01); *F01D 17/162* (2013.01); *Y02T 50/671* (2013.01)
(58) Field of Classification Search
CPC .... F01D 17/16; F01D 17/162; F05D 2250/90; F02C 7/042
See application file for complete search history.

(56) References Cited

U.S. PATENT DOCUMENTS

| 3,376,018 A | 4/1968 | Williamson |
| 3,502,260 A | 3/1970 | Koff |
| 4,430,043 A | 2/1984 | Knight et al. |
| 4,979,874 A | 12/1990 | Myers |

(Continued)

FOREIGN PATENT DOCUMENTS

| EP | 1 188 933 | 3/2002 |
| FR | 1 190 067 | 10/1959 |

(Continued)

OTHER PUBLICATIONS

International Search Report Issued Dec. 19, 2011 in PCT/FR11/51833 Filed Jul. 28, 2011.

*Primary Examiner* — Eric Keasel
*Assistant Examiner* — Cameron Corday
(74) *Attorney, Agent, or Firm* — Oblon, McClelland, Maier & Neustadt, L.L.P.

(57) ABSTRACT

A control device for controlling pivotable vanes of a turbo-machine, including: a plurality of pivotable vanes distributed in azimuth over at least 90° around the axis of the turbo-machine, the pivotable vanes being oriented substantially radially relative to the axis of the turbo-machine; and a control ring portion for controlling pivoting of the vanes, each vane being connected to the control ring portion by a link, the control ring portion being held around the axis of the turbo-machine by the links; wherein at least two of the links are connected to the ring portion by respective ball-joint connections, with other links being connected to the ring portion via respective sliding pivot connections.

18 Claims, 5 Drawing Sheets

(56) References Cited

U.S. PATENT DOCUMENTS 6,802,692 B2 * 10/2004 Bouru .................... F01D 17/16
403/286
2002/0034439 A1   3/2002 Caubet et al.

FOREIGN PATENT DOCUMENTS

| FR | 2 784 711 | 4/2000 |
| GB | 1 216 920 | 12/1970 |
| GB | 1 276 720 | 6/1972 |
| GB | 2 078 865 | 1/1982 |

* cited by examiner

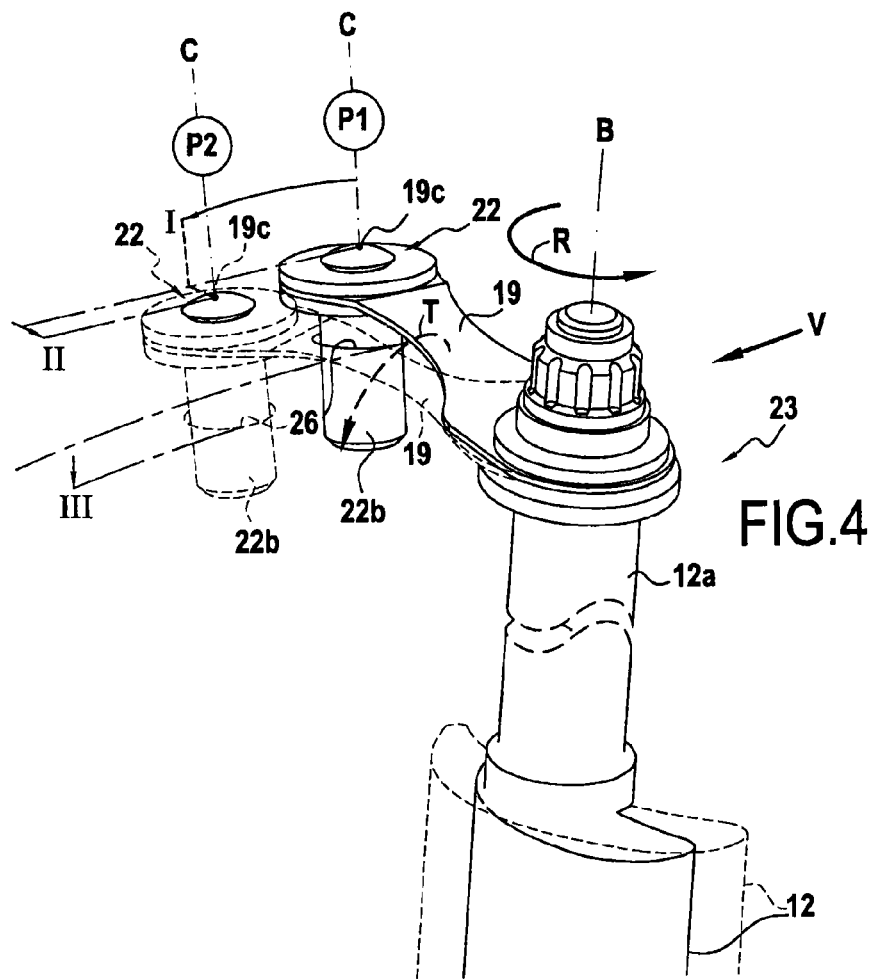
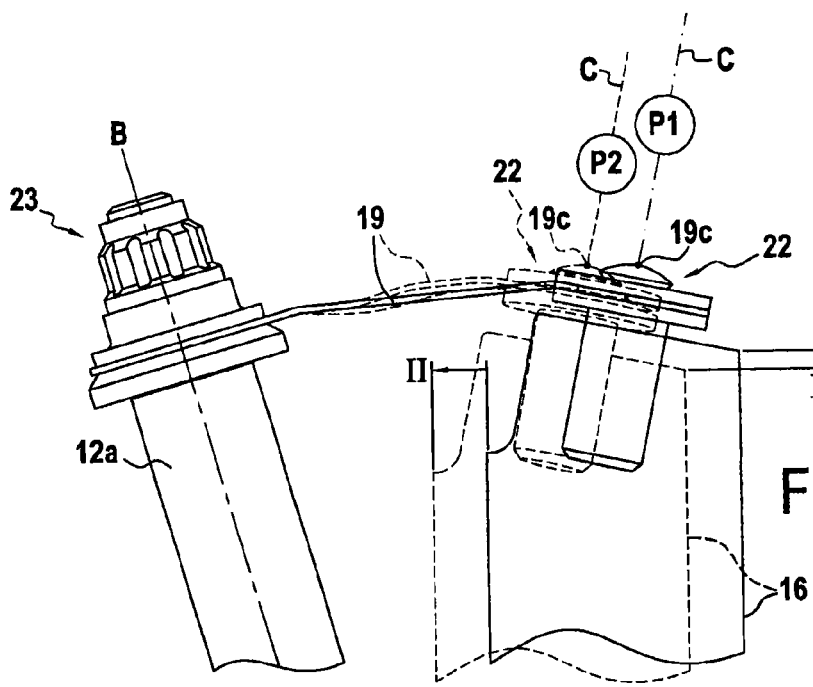

DEVICE FOR CONTROLLING PIVOTABLE VANES OF A TURBO-MACHINE

FIELD OF THE INVENTION

The present invention relates to devices for controlling pivotable vanes of a turbo-machine, and more particularly devices for controlling pivotable vanes in synchronous manner.

BACKGROUND OF THE INVENTION

In a turbo-machine, it is known to make use of one or more stator vane stages for adjusting the stream and the flow direction of the gas passing through the compression section as a function of the operating speed of the turbo-machine. These stator vane stages comprise a plurality of vanes (also known as variable-pitch vanes) that are capable of pivoting about their axes connecting them to the stator so that their pitch angle can be modified as a function of the operating speed of the turbo-machine.

Known devices for controlling the pivotable vanes of a turbo-machine usually comprise a plurality of pivotable vanes distributed in azimuth over at least 90° (ninety degrees of angle) around the axis of the turbo-machine, said pivotable vanes being oriented substantially radially relative to the axis of the turbo-machine, and a control ring portion for controlling the pivoting of the vanes, each vane being connected to the control ring portion by a link, the control ring portion being held around the axis of the turbo-machine by the set of links.

In turbo-machines that have an axial compressor, the vanes are oriented radially around the axis of the turbo-machine and they are pivotable about respective radial axes. It should be observed that the term "oriented substantially radially" covers any configuration in which the radial axes about which the vanes are pivotable form an angle lying in the range 45° to 90° with the axis of the turbo-machine.

Furthermore, it should also be observed that the term "ring portion" is used to cover equally well a complete ring or merely a portion of a ring.

The ring portion is generally controlled by an actuator that causes it to turn about the axis of the turbo-machine, in one direction or the other. The movements of devices of that type are complex and very precise, such that if precision clearances are not complied with, the device can become statically indeterminate (i.e. it jams). In particular, this implies drastic constraints on the positioning and centering of the ring portion relative to the axis of the turbo-machine. Thus, a small departure from these positions leads very quickly to high levels of stress throughout the control device, and possibly to it becoming jammed. This problem of centering (or more generally of positioning) is made worse by thermal expansion differences between the various parts of the device.

OBJECTS AND SUMMARY OF THE INVENTION

An object of the present invention is to remedy the above-mentioned drawbacks, at least in part.

The invention achieves this object by the fact that at least two links are connected to the ring portion by respective ball-joint connections, with each of the other links being connected to the ring portion via respective sliding pivot connections.

A pivot connection (or pivot-only connection) is a connection having only one degree of freedom in rotation, with all the other degrees of freedom being blocked (two degrees in rotation and three degrees in translation). A sliding pivot connection is a pivot connection in which the degree of freedom to move in translation along the axis of rotation of the pivot is made free. Thus, a sliding pivot connection allows movement with one degree of freedom in rotation and one degree of freedom in translation, while the other four degrees of freedom (two in translation and two in rotation) are blocked. A ball-joint connection is a connection that presents three degrees of freedom in rotation, while the degrees of freedom in translation are blocked.

It can thus be understood that the pivot connections are capable of sliding along the directions of their pivot axes, and they are therefore subjected only to forces that act transversely relative to their pivot axes. Consequently, the weight of the ring portion is supported for the most part by the ball-joint connections. Since the pivot connections are sliding connections, they take up only a portion of the weight of the ring portion, which portion depends on the orientation of the sliding pivot connection relative to the gravity direction. Since the vanes are oriented radially, the sliding pivot connections serve to guide the ring portion radially and in azimuth. In other words, although all of the links contribute to holding the ring portion, the ring portion is held for the most part by the ball-joint connections.

Furthermore, since the pivot connections are sliding connections, a movement of the ring portion relative to its centered position about the axis of the turbo-machine (i.e. a radial movement of the ring portion relative to its position centered on the axis of the turbo-machine) gives rise to little or no force in the pivot connections and in the links that are connected thereto. Advantageously, this movement is minimized, e.g. by optimizing the angles and the positions of the reference points in the geometrical configuration of the ring portion.

In addition, since the ring portion is held about its centered position essentially by the two ball-joint connections, this enables the ring portion to be positioned sufficiently accurately about its centered position to provide reliable and precise control over the synchronized pivoting of the vanes, while also accommodating small movements of the ring portion about this centered position. The inventors have observed that centering is optimized and movements are minimized when the axes of rotation of the pivots on the ring portion and the axes of rotation of the vanes intersect in the vicinity of the axis of the turbo-machine.

Thus, the control device of the invention makes it possible to avoid the centering of the ring portion that is required in prior art devices.

In addition, by avoiding the need for such centering, there is no need to install additional setting systems of the kind to be found in prior art devices. The control device of the invention is thus lighter in weight and less expensive than prior art devices.

It should be observed that the rotary movement of the ring portion is driven by the control means, e.g. by an actuator imparting tangential movement to a point of the ring portion, which movement is guided by the two ball-joint connections. These ball-joint connections are angularly spaced apart around the axis of the turbo-machine, and this angular spacing in combination with the fact that movements in translation of the ball-joint connection points are prevented between the ring portion and the links constrains the ring portion to move mainly in turning about the axis of the turbo-machine. Any movement in translation of the ring portion in a radial direction serves to move it off-center, while nevertheless being acceptable in terms of control precision. In a variant, in order to limit these off-centering movements and in order to assist the ball-joint connections in guiding the rotation of the ring portion, one of the sliding pivot connections is prevented from moving in sliding so as to form a pivot-only connection.

Furthermore, a ball-joint connection presents weight and susceptibility to wear that are greater than those of a sliding pivot connection (or a pivot-only connection). By combining the use of a small number of ball joint connections for some of the links with sliding pivot connections (or pivot-only connections) for the other links, the weight of the control device is reduced, while its reliability is improved compared with prior control devices, in particular those using only ball-joint connections or sliding ball-joint connections. This contributes to improving the performance of the turbo-machine on which the control device is mounted (or is to be mounted).

Preferably, the two ball-joint connections are spaced apart in azimuth by about 90°.

This angular spacing between the two ball joints around the axis of the turbo-machine serves to minimize the forces to which each of the connections is subjected while controlling the vanes. An angular spacing of 90° enables each of the ball-joint connections to act independently of the others to support the perpendicular components of each of the forces, thereby distributing the forces in uniform manner, in particular in a device of circular shape.

Furthermore, this arrangement of the ball-joint connections at 90° improves the guidance of the rotary movement of the ring portion.

Advantageously, the two links connected to the ring portion via a respective ball-joint connection are rigid, while the links connected to the ring portion via respective sliding pivot connections are more flexible so as to be capable of deforming elastically.

It can thus be understood that the rigid links do not deform elastically on passing from a first control position of the ring movement to a second control position, whereas the more flexible links tend to deform elastically while passing from a first control position of the ring portion to a second control position.

Naturally, the term "more flexible" is used to mean more flexible than the rigid links. In other words, the links that are connected to the ring portion via a sliding pivot connection are more flexible than the links that are connected to the ring portion via a ball-joint connection.

By deforming elastically, the links that are connected to the ring portion via sliding pivot connections take up the forces to which the control device is subjected. Furthermore, by taking up the forces, this resilient deformation ensures that the movement of the device is not jammed, by allowing an additional degree of freedom in the relative movement of the attachment points of these links. This makes it possible in particular to allow movements in rotation that are limited by a sliding pivot connection but that are allowed by a ball-joint connection. Consequently, these elastic deformations make it possible to avoid excessively stressing the sliding pivot connections, and to preserve them against wear phenomena. Furthermore, these deformations make it easier for the ring portion to move in turning between a first control position and a second control position. Consequently, the forces generated by the control actuator can be smaller. In addition, the off-centering of the ring portion is smaller, thereby further improving the precision with which the pivoting control for the set of vanes is synchronized.

In addition, since the ball-joint connections are those that hold the ring portion, the links that are connected to those connections are sufficiently rigid for holding the ring portion in a substantially centered position on the axis of the turbo-machine (i.e. centered or in the near vicinity of the centered position) without deforming elastically, in particular during a control movement of the ring portion.

Furthermore, since the rigid links are connected to the ring portion via ball-joint connections, they are not subjected to any torsion moment similar to those applied to the links that are connected to the ring portion via sliding pivot connections. The relative movement in rotation of the two attachment points of each rigid link is compensated by its ball-joint connection.

It should be observed that the advantage from the point of view of improved control over movement that is obtained by the ball-joint connections is counterbalanced by their considerable weight and their susceptibility to wear. That is why the inventors have designed a control device that is fitted with a minimum number of ball-joint connections (i.e. two) that are connected to rigid links, and in which the other connections are sliding pivot connections that are connected to links that are more flexible, and preferably that are elastically deformable in torsion.

Advantageously, the more flexible links are elastically deformable in torsion and in bending.

This makes it possible to compensate for any jamming that might occur in the pivoting connections and the rigid links that are connected thereto so as to facilitate movement of the ring portion while reducing mechanical stresses in the vicinity of the sliding pivot connections and of the ball-joint connections.

Below, the term "resilient link" is used to designate a link that is more flexible and that is elastically deformable, whereas the term "rigid link" is naturally used for designating a link that is rigid.

The invention also provides a turbo-machine fitted with a pivotable vane control device of the invention as described above.

BRIEF DESCRIPTION OF THE DRAWINGS

The invention and its advantages can be better understood on reading the following detailed description of an embodiment given by way of non-limiting example. The description makes reference to the accompanying drawing sheets, in which:

FIG. 4 shows the movements of a resilient link during turning of the control ring;

FIG. 5 is a view looking along arrow V of FIG. 4;

MORE DETAILED DESCRIPTION

Figure 1:
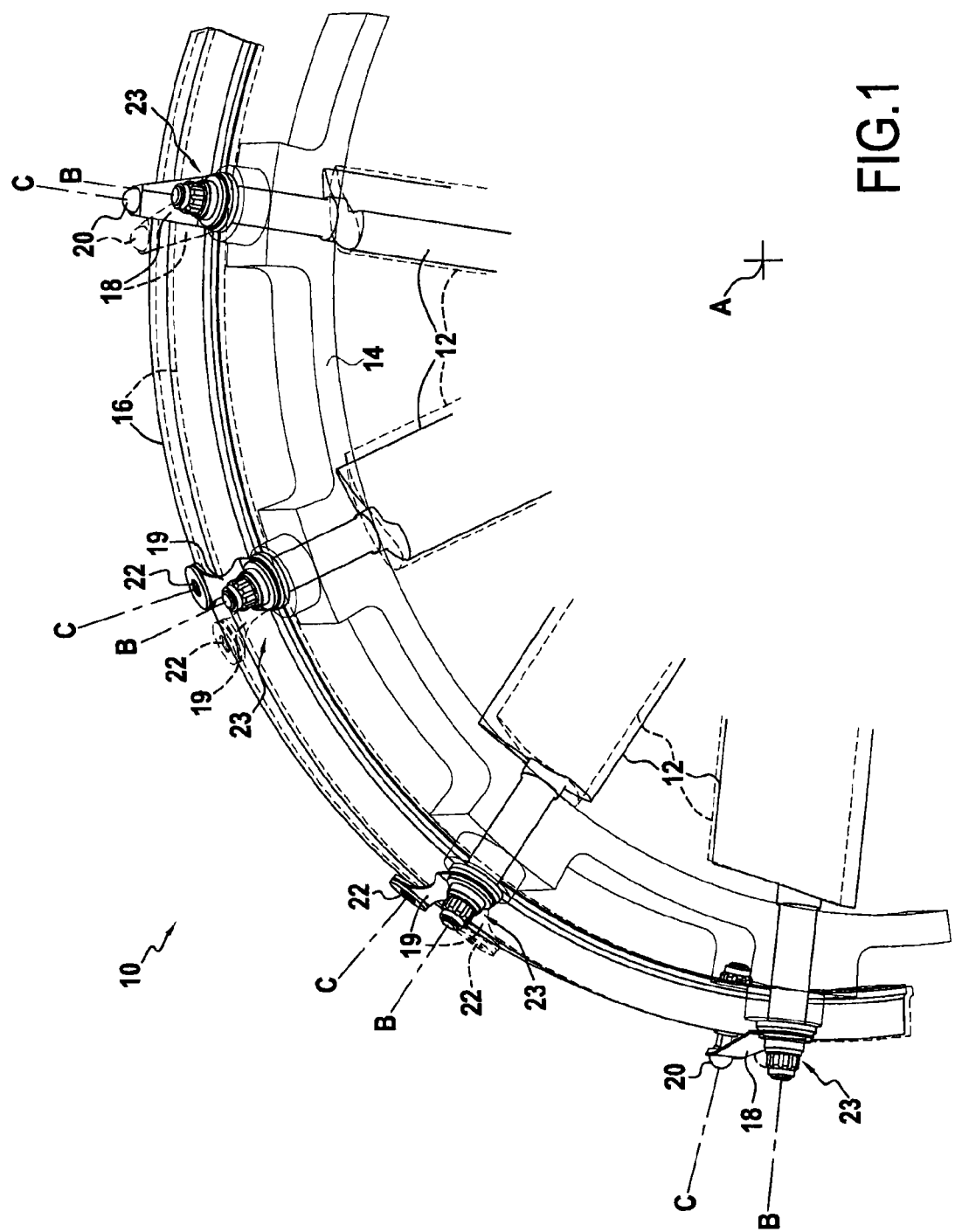
FIG. 1 is a fragmentary perspective view of an embodiment of the control device of the invention.

FIG. 1 shows an embodiment of the device of the invention for controlling pivotable vanes in a turbo-machine. In this embodiment, the vanes are oriented radially relative to the axis of the turbo-machine. The view shown is a fragmentary view, with the complete device extending over 360° around the axis A of an turbo-machine (not shown). This axis A defines the longitudinal direction. Radial and azimuth directions are defined relative to the axis A.

The control device 10 comprises a plurality of vanes 12 that are pivotally mounted on the stator 14. The pivot axis B of each vane 12 is oriented in a radial direction. Each of the vanes 12 is mounted on the stator 14 via a pivot-only connection 23, i.e. a pivot connection in which the only movement (or degree of freedom) that is allowed is a turning movement about the axis B.

Each of the vanes 12 is connected to a control ring 16 via a link. Each rigid link 18 connects a vane 12 to the ring 16 via a ball joint connection 20, whereas each resilient link 19 connects a vane 12 to the ring 16 via a sliding pivot connection 22. The overall device 10 presents two rigid links 18 and two ball joint links 20. The two rigid links 18 are spaced apart in azimuth by 90° about the axis A. The two rigid links 18 are thus connected to two vanes 12 that are spaced apart in azimuth by 90°, and they are connected to the ring 16 by two ball-joint connections 20 that are likewise spaced apart in azimuth by 90°.

It should be observed that the movements (or degrees of freedom) allowed by a sliding pivot 22 are turning movements about the axis C and movements in translation along the axis C.

Figure 2:
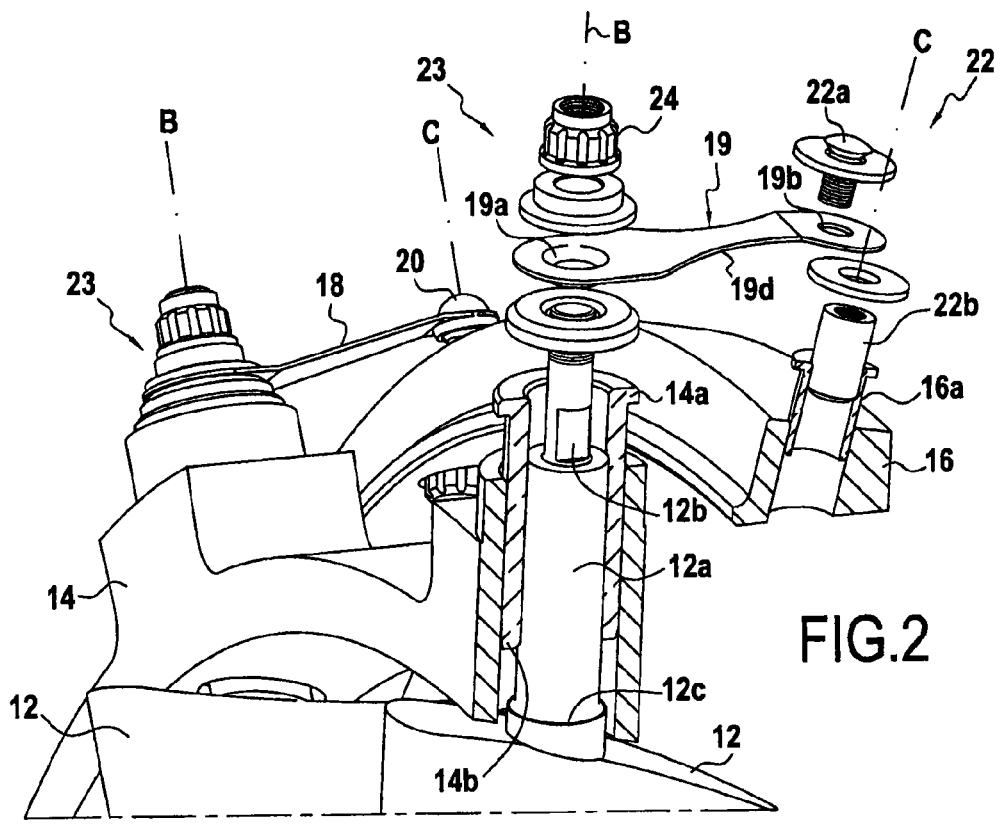
FIG. 2 is an exploded perspective view of the assembly comprising a resilient link with a sliding pivot connection as shown in FIG. 1.
Figure 3:
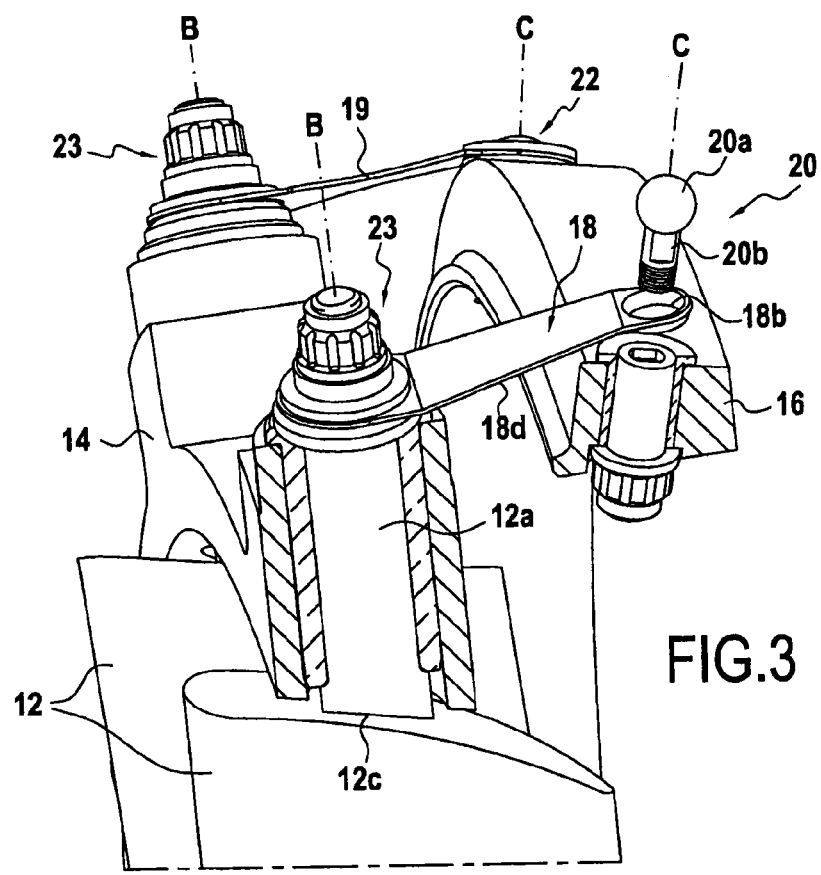
FIG. 3 is an exploded perspective view of the assembly comprising a rigid link with a ball joint connection of FIG. 1.

It should also be observed that the flexibility given to the resilient links 19 relative to the rigid links 18 is due in particular to their central profile 19*d* being narrower than the profile 18*d* of the rigid links 18 (cf. FIGS. 2 and 3).

FIG. 1 shows firstly the ring 16 in continuous lines corresponding to a first control position for the vanes 12, and the ring 16 in discontinuous lines corresponding to a second control position. To bring the ring 16 from the first control position to the second, an actuator (not shown) connected to the ring 16 imparts a movement in translation to a connection point between the actuator and the ring, which movement is tangential to the azimuth direction of the ring, thereby having the consequence of the ring 16 being moved in azimuth, given that it is held around the axis A by the ball joint connections 20. Consequently, the ring 16 turns through a certain angle about the axis A.

It should be observed that during the azimuth movement of the ring 16, the links 18 and 19 supporting the ring 16 pivot, thereby imparting a movement in translation on the ring 16 along the axis A. In this example, the first control position corresponds to a position in which the links 18 and 19 are substantially perpendicular to the ring 16 and to the stator 14, and the position of the links in the second position causes the ring 16 to move along the axis A towards the stator 14. Since the stator 14 is stationary in the turbo-machine (not shown), it is necessarily the ring 16 that moves relative to the stator 14. This movement is represented by arrow II in FIGS. 4, 5, and 6.

FIG. 2 is an exploded perspective view of the system for connecting a vane 12 mounted on the casing 14 via a pivot link 23 with the ring 16 via a resilient link 19 and a sliding pivot connection 22.

The vane 22 is mounted on the casing 14 by means of a pivot connection 23. The rod 12*a* of the vane 12 is engaged in a bushing 14*a* of the stator 14, thus forming a pivot connection between the stator 14 and the vane 12.

The link 19 is also directly connected to the vane 12. The rod 12*a* is engaged in an eyelet 19*a* in the link 19 and it is locked by means of a nut 24 and washers clamping on either side of the link 19. The nut 24 also makes it possible to block the vane 12 against moving in translation relative to the stator 14 by bringing the shoulder 12*c* of the rod 12*a* to bear against the end 14*b* of the bushing 14*a*. A flat 12*b* formed on the rod 12*a* co-operates via complementary shapes with the eyelet 19*a* of the link 19, thereby coupling the vane 12 to move in rotation with the link 19.

The eyelet 19*b* formed in the link 19 at its end opposite from the eyelet 19*a* is connected to the ring 16 by the sliding pivot connection 22. A screw 22*a* extending through the eyelet 19*b* and washers clamping against the link 19 serve to connect the link 19 to a rod 22*b*. The screw 22*a* is screwed to the rod 22*b* which is engaged in a bushing 16*a* of the ring 16. The rod 22*b* can slide freely and can pivot in the bushing 16*a* along and about the axis C.

FIG. 3 is an exploded perspective view of the system connecting a vane 12 mounted on the casing 14 via a pivot connection 23 with the ring 16 via a rigid link 18 and a ball-joint connection 20.

The pivot connection 23 is similar to that described above. In FIG. 3, the elements making up this connection 23 are shown assembled.

The ball-joint connection 20 connects the rigid link 18 to the ring 16. A spherical endpiece 20*a* of a threaded rod 20*b* that is screwed to the ring 16 is engaged in the eyelet 18*b* of the rigid link 18 and co-operates via complementary shapes with the eyelet 18*b*. Thus, all movements in rotation (i.e. all three degrees of freedom in rotation) are allowed between the rigid link 18 and the ring 16.

FIGS. 4 and 5 show the movements of the end of the resilient link 19 that is connected to the ring 16 (not shown in FIG. 4). Continuous lines correspond to the positioning of the elements when the ring 16 is in the first control position of FIG. 1, while discontinuous lines correspond to the positioning of the elements when the ring is in the second control position of FIG. 1.

During the movement of the ring 16 from the first control position towards the second, the reference point 19*c* corresponding to the center of the eyelet 19*b* in the resilient link 19 passes from a position P1 to a position P2.

Thus, in order to pass from the position P1 to the position P2, the overall movement of the reference point 19*c* is made up of two elementary movements. This has the consequence of causing the vane 22 to pivot as shown by arrow R (cf. FIG. 4).

The first elementary movement is represented by arrow I and corresponds to the ring 16 turning about the axis A of the turbo-machine, possibly together with movement in translation of the rigid body (imposed by the actuator and by the rigid links 18). This turning movement imparts torsion deformation to the resilient link 19 as represented by arrow T. The axis C of the sliding pivot 22 conserves a constant alignment relative to the ring but not relative to the axis B of the pivot 23, thus causing the link 19 to perform movement in rotation about the axis extending between the two eyelets 19*a* and 19*b* (or the axis of the link 19). The eyelets 19*a* and 19*b* are prevented from turning about the direction of the axis of the link 19, so the link 19 is subjected to torsion.

It should be observed that this movement I is imparted to the ring 16 by the actuator (not shown) and by the rigid links 18 that guide the ring 16.

The second elementary movement is represented by arrow II and corresponds to a movement in axial translation along the axis A of the turbo-machine, as described above.

Relative movement between the point 19*c* and the ring 16 also takes place. This relative movement is represented by arrow III. The position of the outer periphery of the ring 16 is represented by the line 26 on the rod 22b in FIG. 4. During the movement I, even though the link 19 is elastically deformable, it tends to keep the point 19c in the same plane as the plane it occupies when the ring 16 is in the first control position. Furthermore, during the movement I, the ring 16 connected to the link 19 via the sliding pivot connection 22 moves away from the plane in which the point 19c is located in the first control position. This corresponds to a conventional back-and-forth movement of one of the coordinates of a point in a rectangular frame of reference arranged on the periphery of a wheel when the wheel rotates. In FIG. 5, this relative movement III corresponds to a downward movement of the sheet of the section of the ring 16 located in the plane of the sliding pivot connection 22. This relative movement is made possible by the sliding nature of the sliding pivot connection 22.

It should be observed that the above-described movements I, II, III, and the deformation T correspond to resolving the overall movement of the assembly and the overall deformations of the resilient links 19 into more simple movements in order to simplify understanding how the assembly moves. Nevertheless, it should not be forgotten that in their overall movement, the resilient links 19 also deform in bending (to compensate for any movement of the rigid body of the ring 16 along the direction of arrow III), with the overall elastic deformation (i.e. deformation in bending and in torsion) of each of the resilient links 19 serving to compensate for the movement of the overall rigid body of the ring 16 (in the directions of arrows I and III) as imposed thereon by the actuator and by the rigid links 18.

Figure 6:
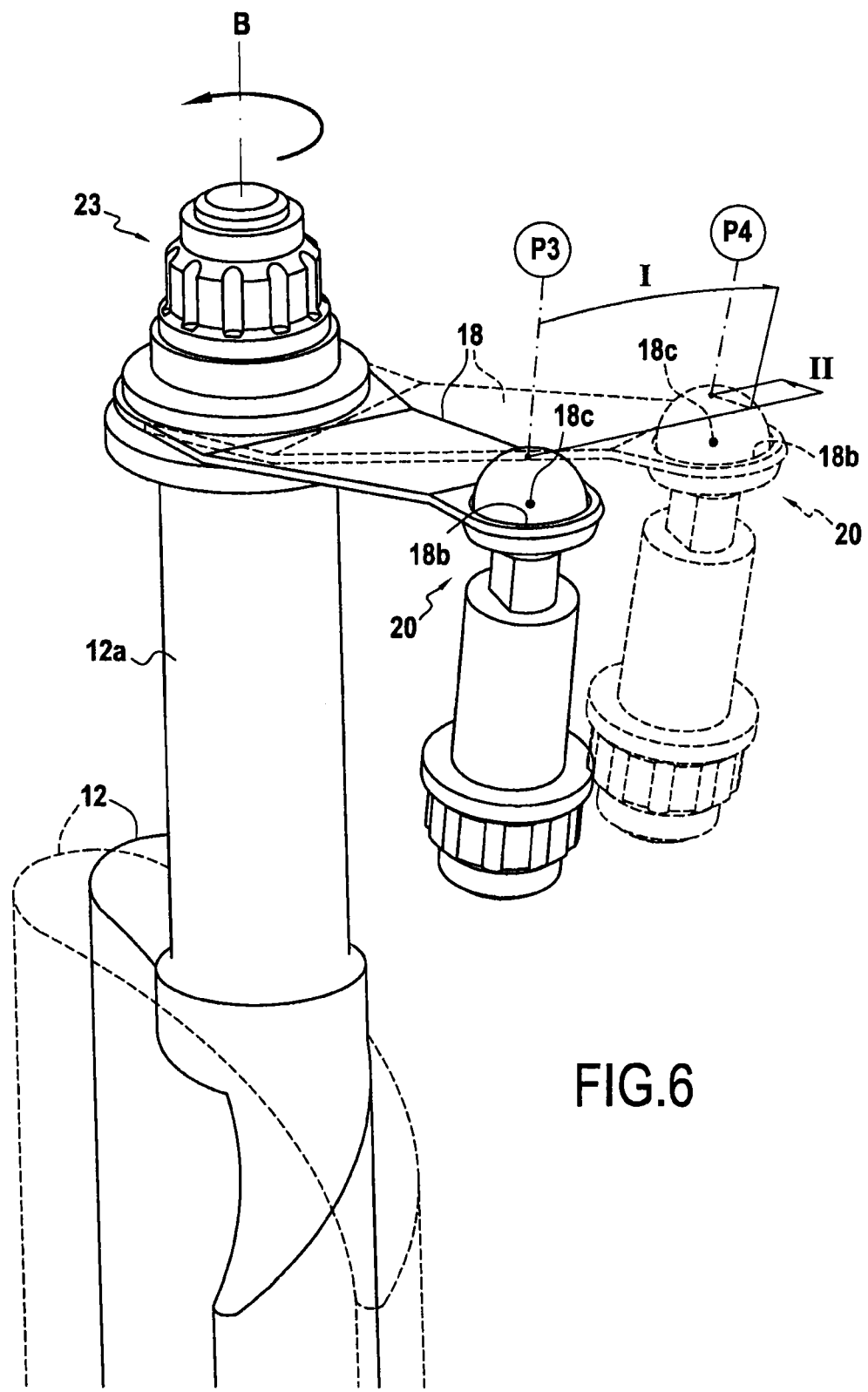
FIG. 6 shows the movements of a rigid link during turning of the control ring.

FIG. 6 shows the movement of the end of the rigid link 18 that is connected to the ring 16 (not shown). Continuous lines correspond to the positioning of the elements when the ring 16 is in the first control position of FIG. 1, while discontinuous lines correspond to the positioning of the elements when the ring is in the second control position of FIG. 1.

During the movement of the ring 16 from the first control position towards the second, the reference point 18c corresponding to the center of the eyelet 18b of the rigid link 18 passes from position P3 to position P4.

Thus, in order to pass from the position P3 to the position P4, the overall movement of the reference point 18c can be resolved as two elementary movements I and II similar to the movements described above and represented by arrow I and II.

Since the link 18 is connected to the ring 16 via a ball-joint connection 20, the link 18 is not subjected to torsion moment. Consequently, unlike the link 19, the link 18 does not deform in torsion. Furthermore, the link 19 is sufficiently rigid to avoid deforming in bending during normal operation of the control device 10. In other words, in this example, in order to pass from the first control position to the second control position, the link 18 does not deform elastically. Thus, unlike the point 19c of the resilient link 19 as shown in FIGS. 4 and 5, the point 18c of the rigid link 18 does not move along arrow III of FIGS. 4 and 5.

Figure 7:
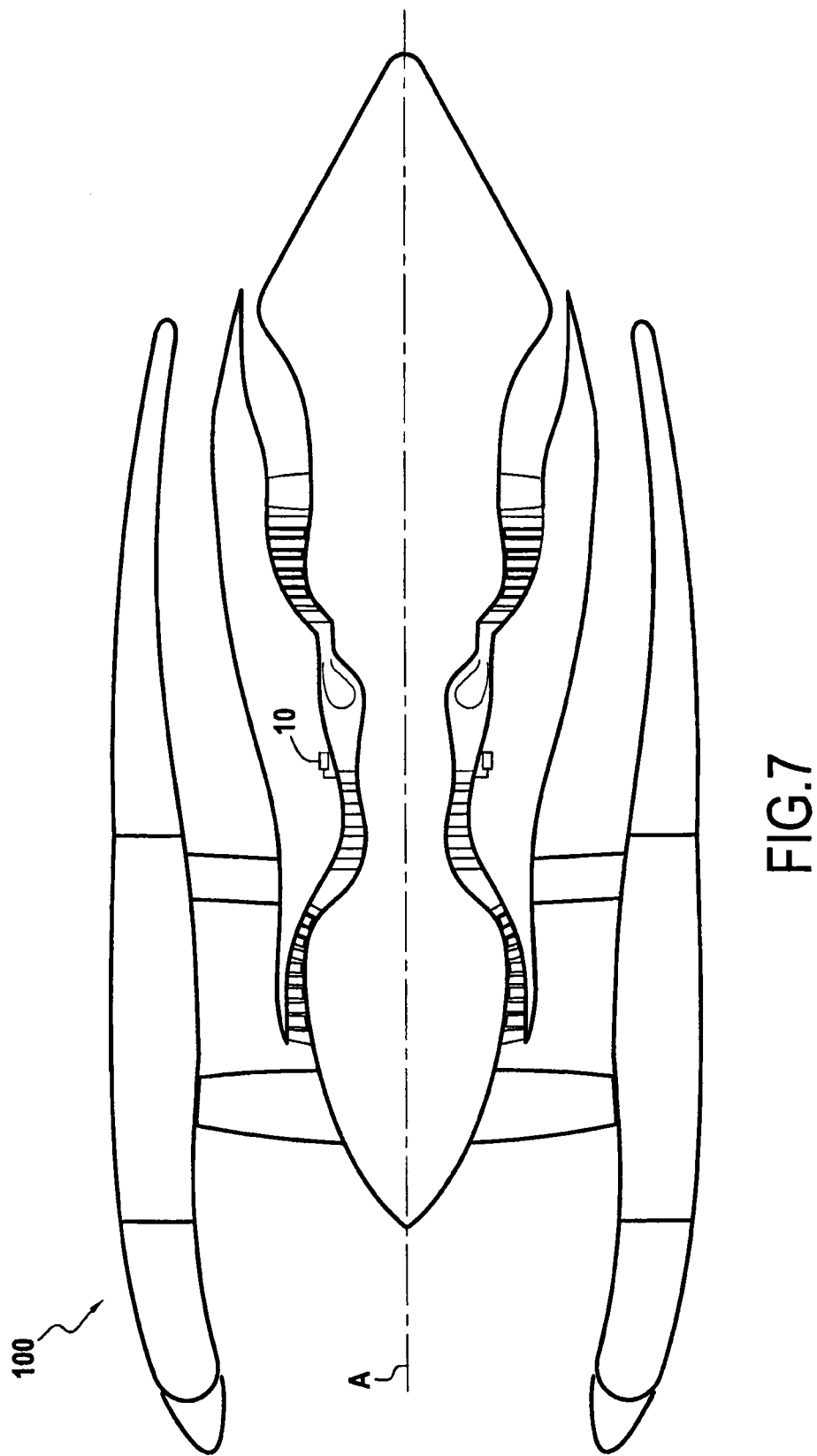
FIG. 7 shows a turbo-machine fitted with a pivotable vane control device of the invention.

FIG. 7 shows a turbo-machine 100 fitted with the above-described device 10 for controlling pivotable vanes.

Without going beyond the ambit of the present invention, the control device may be mounted on a helicopter turbine engine.

The invention claimed is:

1. A control device for controlling pivotable vanes of a turbo-machine, comprising:
    a plurality of pivotable vanes distributed in azimuth over at least 90° around an axis of the turbo-machine, the pivotable vanes being oriented substantially radially relative to the axis of the turbo-machine; and
    a control ring portion to control pivoting of the vanes, each vane being connected to the control ring portion by a link, the control ring portion being held around the axis of the turbo-machine by the links;
    wherein at least two of the links are connected to the ring portion by respective ball-joint connections, with other links among the links being connected to the ring portion via respective sliding pivot connections, and
    wherein the two ball-joint connections are spaced apart in azimuth by about 90°.

2. A control device according to claim 1, wherein the two of the links connected to the ring portion via the respective ball-joint connections are rigid, while the other links among the links connected to the ring portion via the respective sliding pivot connections are more flexible so as to be elastically deformable.

3. A control device according to claim 2, wherein the more flexible links are elastically deformable in torsion and in bending.

4. A control device according to claim 1, wherein one of the links is connected to the ring portion via a pivot-only connection.

5. A turbo-machine comprising a pivotable vane control device according to claim 1.

6. A control device according to claim 1, wherein the ring portion is spaced apart from a stator that mounts the pivotable vanes in a direction along the axis of the turbo-machine.

7. A control device for controlling pivotable vanes of a turbo-machine, comprising:
    a plurality of pivotable vanes distributed in azimuth over at least 90° around an axis of the turbo-machine, the pivotable vanes being oriented substantially radially relative to the axis of the turbo-machine; and
    a control ring portion to control pivoting of the vanes, each vane being connected to the control ring portion by a link, the control ring portion being held around the axis of the turbo-machine by the links;
    wherein at least two of the links are connected to the ring portion by respective ball-joint connections, with other links among the links being connected to the ring portion via respective sliding pivot connections,
    wherein the two of the links connected to the ring portion via the respective ball-joint connections are rigid, while the other links among the links connected to the ring portion via the respective sliding pivot connections are more flexible so as to be elastically deformable.

8. A control device according to claim 7, wherein he two ball-joint connections are spaced apart in azimuth by about 90°.

9. A control device according to claim 7, wherein the more flexible links are elastically deformable in torsion and in bending.

10. A control device according to claim 7, wherein one of the links is connected to the ring portion via a pivot-only connection.

11. A turbo-machine comprising a pivotable vane control device according to claim 7.

12. A control device according to claim 7, wherein the ring portion is spaced apart from a stator that mounts the pivotable vanes in a direction along the axis of the turbo-machine.

13. A control device for controlling pivotable vanes of a turbo-machine, comprising:

a plurality of pivotable vanes distributed in azimuth over at least 90° around an axis of the turbo-machine, the pivotable vanes being oriented substantially radially relative to the axis of the turbo-machine; and a control ring portion to control pivoting of the vanes, each vane being connected to the control ring portion by a link, the control ring portion being held around the axis of the turbo-machine by the links;

wherein at least two of the links are connected to the ring portion by respective ball-joint connections, with other links among the links being connected to the ring portion via respective sliding pivot connections, wherein one of the links is connected to the ring portion via a pivot-only connection.

14. A control device according to claim 13, wherein the two ball-joint connections are spaced apart in azimuth by about 90°.

15. A control device according to claim 13, wherein the two of the links connected to the ring portion via the respective ball-joint connections are rigid, while the other links among the links connected to the ring portion via the respective sliding pivot connections are more flexible so as to be elastically deformable.

16. A control device according to claim 15, wherein the more flexible links are elastically deformable in torsion and in bending.

17. A turbo-machine comprising a pivotable vane control device according to claim 13.

18. A control device according to claim 13, wherein the ring portion is spaced apart from a stator that mounts the pivotable vanes in a direction along the axis of the turbo-machine.

* * * * *

UNITED STATES PATENT AND TRADEMARK OFFICE
CERTIFICATE OF CORRECTION

PATENT NO. : 9,551,234 B2
APPLICATION NO. : 13/813257
DATED : January 24, 2017
INVENTOR(S) : Christophe Colette et al.

It is certified that error appears in the above-identified patent and that said Letters Patent is hereby corrected as shown below:

On the Title Page

Item (73), the Assignee's Name is incorrect. Item (73) should read:

-- (73) Assignee: TURBOMECA, Bordes (FR) --

Signed and Sealed this
Thirteenth Day of March, 2018

Andrei Iancu
*Director of the United States Patent and Trademark Office*